United States Patent
Iwase et al.

(10) Patent No.: US 8,115,814 B2
(45) Date of Patent: Feb. 14, 2012

(54) MOBILE TRACKING SYSTEM, CAMERA AND PHOTOGRAPHING METHOD

(75) Inventors: Yoshihiko Iwase, Yokohama (JP); Masaaki Imaizumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1518 days.

(21) Appl. No.: 11/221,724

(22) Filed: Sep. 9, 2005

(65) Prior Publication Data

US 2006/0066723 A1 Mar. 30, 2006

(30) Foreign Application Priority Data

Sep. 14, 2004 (JP) .................................. 2004-266823

(51) Int. Cl.
*H04N 5/225* (2006.01)
*G06K 9/00* (2006.01)

(52) U.S. Cl. .............. 348/169; 348/47; 348/64; 348/73; 348/137; 348/142; 348/143; 348/153; 348/159; 348/207.1; 348/207.11; 348/208.16; 348/211.6; 348/211.8; 348/211.9; 348/211.11; 348/211.14; 348/352; 348/420; 396/54; 396/55; 396/65; 396/78; 396/90; 396/97; 396/98; 396/102; 396/103; 396/104; 396/111; 396/115; 396/121; 396/132; 396/147; 382/103; 382/104; 382/107; 382/154; 382/284; 345/87; 345/427; 345/633

(58) Field of Classification Search ............. 348/47, 348/64, 73, 137, 142, 143, 153, 159, 169, 348/207.1, 207.11, 208.16, 211.6, 211.8, 348/211.9, 211.11–211.14, 352, 420; 382/103, 382/104, 154, 107, 284; 345/427
See application file for complete search history.

(56) References Cited

U.S. PATENT DOCUMENTS

| | | | | |
|---|---|---|---|---|
| 6,680,746 B2* | 1/2004 | Kawai et al. | ............... | 348/211.9 |
| 7,227,569 B2* | 6/2007 | Maruya | ......................... | 348/143 |
| 7,327,383 B2* | 2/2008 | Valleriano et al. | ............ | 348/143 |

(Continued)

FOREIGN PATENT DOCUMENTS

| JP | 9-331520 A | 12/1997 |
|---|---|---|
| JP | 2004-056664 A | 2/2004 |
| JP | 2004-72628 A | 3/2004 |

OTHER PUBLICATIONS

Official Letter dated Mar. 25, 2010, issued in corresponding Japanese Patent Application No. 2004-266823.

*Primary Examiner* — Steven Kau
(74) *Attorney, Agent, or Firm* — Fitzpatrick, Cella, Harper & Scinto

(57) ABSTRACT

An apparatus and method to track and to photograph a mobile object over a wide range, by a cooperative operation of multiple cameras. In addition, a mobile tracking system is provided for tracking the mobile object by the cooperation of multiple cameras, in which each camera includes a photographing device which photographs and recognizes the mobile object, a changing device which changes a view angle of the photographing device, a position deriving device which derives a position of the camera, a distance deriving device which derives the distance between the camera and the mobile object, and a communication device which transmits an identifier of the camera, a position of the camera, a moving direction of the mobile object and the distance between the camera and the mobile object to another camera and receives an identifier of the other camera, a position of the other camera, a moving direction of the mobile object and a distance between the other camera and the mobile object from the other camera.

20 Claims, 5 Drawing Sheets

U.S. PATENT DOCUMENTS

| | | | |
|---|---|---|---|
| 2002/0024599 A1* | 2/2002 | Fukuhara et al. | 348/169 |
| 2002/0067412 A1* | 6/2002 | Kawai et al. | 348/211 |
| 2004/0166829 A1* | 8/2004 | Nakae et al. | 455/403 |
| 2004/0257444 A1* | 12/2004 | Maruya et al. | 348/169 |

* cited by examiner

MOBILE TRACKING SYSTEM, CAMERA AND PHOTOGRAPHING METHOD

BACKGROUND OF THE INVENTION

1. Field of the Invention

The present invention relates to a mobile tracking system, a camera and a photographing method.

2. Related Background Art

It is possible, in the prior technology, to track a mobile object by a single camera, utilizing an image processing technology. However, as it is difficult to continuously photograph a mobile object with a single camera over a wide range, multiple cameras are required for photographing a mobile object over a wide range. Mobile tracking systems using multiple cameras are classified into a centralized control type and an autonomic dispersed type. In the centralized control type, as the dispersed data are collectively managed, it is possible to recognize the status of the entire system. However, this type is unsuitable for a system of a large magnitude because of an increased burden on a server. Also it involves a risk that a failure in the server affects the entire system. On the other hand, an autonomic dispersed type, in which data processing is executed in each piece of equipment, imposes a limited burden on a network even in a large magnitude system. A mobile tracking system requiring cooperation of multiple-cameras has various advantages, such as flexibility in operation, and robustness by the integration of results of observation from various angles. It is thus rendered possible to realize various applied systems, such as a wide-range monitoring system or an ITS (intelligent transport system).

As an example, Japanese Patent Application Laid-open No. 2004-72628 discloses a mobile tracking system utilizing multiple-cameras, and a method therefor. A camera agent enters a moving image, photographed with a camera, by every frame into a processor, which analyzes a frame image, thereby extracting a person area in the image and a feature amount thereof. Then frames are matched on a time-axis by the extracted feature amount, thereby realizing extraction of a personal image and a feature amount thereof. When the camera agent detects a person, a tracking agent is generated. Multi-tracking agents constitute a group including a main agent and multi-sub agents, and the tracking agent functioning as the main agent summarizes the feature amount of the person, thereby achieving a cooperative operation.

However, in order to correlate a pixel position in the image of each camera with a coordinate system common to multiple-cameras (calibration of camera), one camera is installed in a fixed position and has a fixed view angle. Also since the view angles of the cameras have to overlap partially, a large number of cameras have to be employed for covering a wide range.

SUMMARY OF THE INVENTION

The present invention has been made in consideration of such situation. There are employed multiple-cameras present within a space, and such cameras are capable of changing a view angle or are mounted on a movable object. The cameras can arbitrarily move by a walking, a running or a flying, and such multiple-cameras execute a cooperative operation to provide a system capable of tracking and photographing an object mobile over a wide range.

A mobile tracking system of the present invention is a system for tracking a mobile object by the cooperation of multiple-cameras, wherein each camera includes photographing means which photographs and recognizes a mobile object, changing means which changes a view angle of the photographing means, position deriving means which derives a position of the camera to which it belongs, transmitting means which transmits an identifier of the camera to which it belongs, position information of the camera to which it belongs, and moving direction information of the mobile object to another camera and receives an identifier of the other camera, position information of the other camera, and moving direction information of the mobile object from the other camera, and inference means which infers a behavior based on the information obtained by itself and the information from the other camera.

Also, a camera of the present invention includes photographing means which photographs and recognizes a mobile object, changing means which changes a view angle of the photographing means, position deriving means which derives a position of the camera, transmitting means which transmits an identifier of the camera, position information of the camera, and moving direction information of the mobile object to another camera and receives an identifier of the other camera, position information of the other camera, and moving direction information of the mobile object from the other camera, and inference means which infers a behavior based on the information obtained by itself and the information from the other camera.

Also a photographing method of the present invention includes a photographing step of photographing and recognizing a mobile object with a camera, a position deriving step of deriving a position of the camera, a transmitting step of transmitting an identifier of the camera, position information of the camera, and moving direction information of the mobile object to another camera, and, and an inference step of inferring a behavior based on the information obtained by itself and the information from the other camera.

Thus, according to the present invention, multiple-cameras execute a cooperative operation thereby tracking and photographing an object mobile over a wide range.

DETAILED DESCRIPTION OF THE PREFERRED EMBODIMENTS

Figure 1:
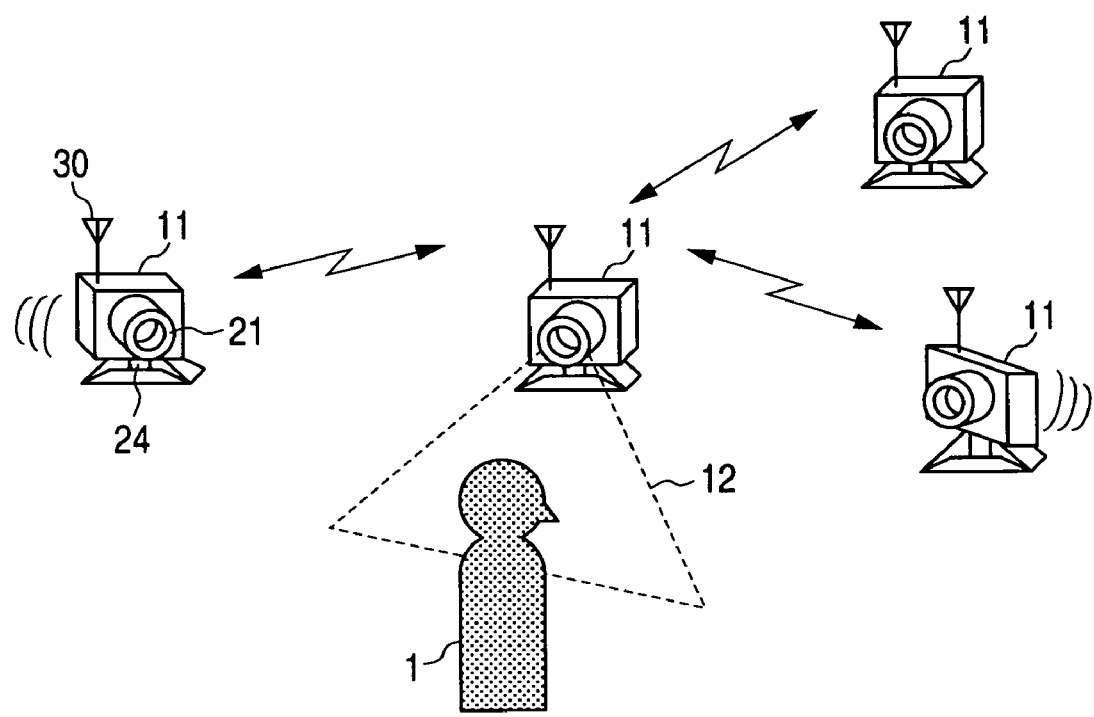
FIG. 1 is a schematic view showing an entire configuration of a mobile tracking system embodying the present invention.

In the following, a mobile tracking system embodying the present invention will be explained with reference to the accompanying drawings. FIG. 1 illustrates an entire configuration of a mobile tracking system embodying the present invention. The mobile tracking system of the present embodiment is constituted of multiple movable autonomic cameras 11, also called autonomic photographic apparatus 11, which are dispersed geographically. Reference numeral 12 denotes a recognition range of an autonomic photographic apparatus 11. When a mobile object constituting an object to be photographed enters this recognition range 12 and is recognized by the autonomic camera 11, it initiates a tracking operation while executing a photographing operation. An antenna 30 is provided for executing communication among the multiple autonomic cameras 11. When the autonomic cameras 11 photograph the object moving member 1 (also called the target 1) in a tracking environment, the cameras 11 mutually execute a wireless transmission/reception, utilizing the antenna 30.

Figure 2:
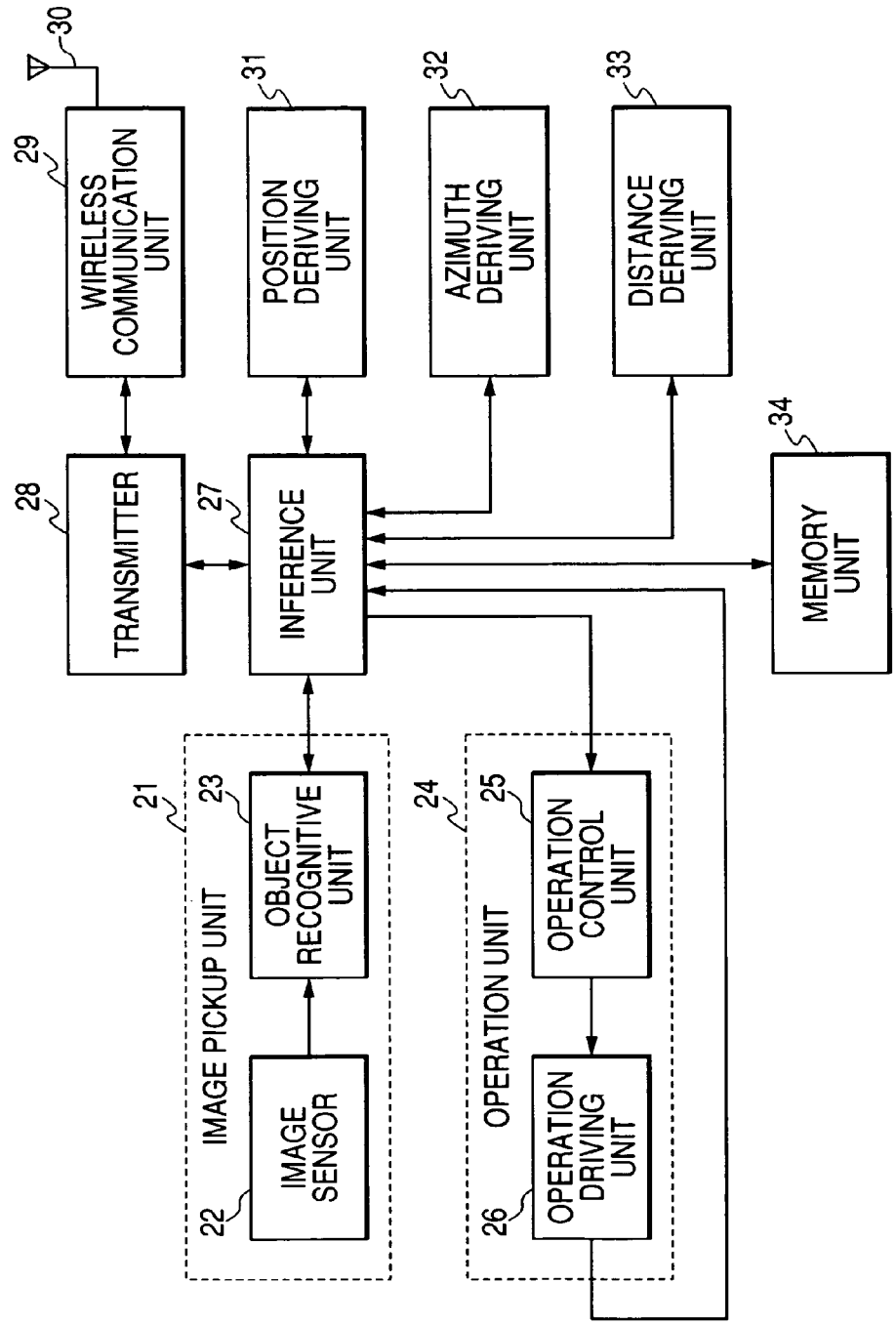
FIG. 2 is a block diagram showing a configuration of a camera embodying the present invention.

In the following, there will be explained a detailed structure of the autonomic camera 11 shown in FIG. 1, with reference to FIG. 2, which is a block diagram of the autonomic camera 11. An image pickup unit 21 is constituted of an image sensor 22 for target 1, and an object recognition unit 23 for recognizing and identifying the target 1.

In the image pickup unit 21, a moving image photographed by the image sensor 22 is supplied to the object recognition unit 23, formed by a processor. Then the target 1 is extracted from each frame of the entered moving image. The object recognition unit 23 is capable, by an optical flow method, of obtaining information on the moving direction, the speed, and the depth from the camera, of the target 1. An area extraction of the target 1 is made possible for example by combining a color processing. A process for extracting the target 1 from the image is not limited to the optical flow method, but can also be an interframe difference method, a background subtraction method, a template matching method, a marker detection method or a combination thereof.

The antenna 30 of each camera is provided for executing wireless communication with another autonomic camera 11 in the vicinity. A wireless communication unit 29 executes a wireless transmission of data to the autonomic camera 11 in the vicinity of the target 1 by the image pickup unit 21. The wireless transmission is executed by a suitable method selected from an electromagnetic wave transmission method, such as IEEE802.11, Bluetooth, ZigBee, Home RF or UWB (ultra wide band) or an optical wireless communication method, according to the purpose.

An inference unit 27 of the autonomic camera 11 that has photographed the target 1 executes a determination as to whether to track and continue to photograph the target 1, or to execute a pan-tilt-zooming only and request that a photographing operation be performed by another autonomic camera 11. Upon photographing the target 1, the multiple autonomic cameras 11 mutually execute communication through their respective transmitters 28, wireless communication units 29 and antennae 30. Data transmitted in case of photographic target 1 include the ID of the camera, the position of the camera, the moving direction of the target 1 and a feature of the mobile object.

The inference unit 27 of the autonomic camera 11 that has received the data executes a determination as to whether to turn in a direction of the target 1 or to move to prepare for photographing. Then it calculates a proportion that the target 1 moves toward itself, and transmits the calculated relation to the autonomic camera 11 that has photographed the target 1.

The autonomic camera 11 that has photographed the target activates an operation unit 24 for tracking the target 1. The operation unit 24 is constituted of an operation control unit 25 for executing an operation control of the autonomic camera 11 based on a control amount, inferred by the inference unit 27 from received data from another camera 11 and data obtained by itself, and an operation driving unit 26 for executing a drive operation based on a control signal outputted from the operation control unit 25. Then, a drive amount for the operation unit 24 is notified to the inference unit 27. In a photographing operation performed by tracking the target 1, in case the operation unit 24 is, for example, a wheel, a revolution and a direction of the wheel are controlled according to the moving amount and the speed of the target 1. The operation unit 24 is not limited to a running (wheel) operation, but may also assume a walking or flying configuration. Also the operation unit 24 need not necessarily be operated constantly but may be operated according to the situation. The operation unit 24 can also change the direction of the camera, by panning or tiling the image pickup unit 21. Also the operation unit 24 can change the view angle of the image pickup unit 21 by changing the camera angle of the autonomic camera and/or the position thereof.

A position deriving unit 31 obtains the position of the autonomic camera 11 because it can arbitrarily change the position, and notifies the inference unit 27 of the obtained result. For obtaining information on the current position, in a positional information detecting system utilizing a wireless LAN, the position of the autonomic camera 11 itself can be specified by a calculation process such as a cell ID process, a trigonometry process or a probability process. Also according to the environment of use, there can be utilized a wireless LAN, a GPS, a PHS, an image, an RFID, an ultrasonic wave or a combination thereof for specifying its own position.

A direction deriving unit 32 obtains an direction of the image pickup unit 21 (camera angle) of the autonomic camera 11, for example, by a magnetic sensor, and notifies the inference unit 27 of the obtained result. Then, a moving direction of the target 1 is estimated from such direction and the direction of the target 1 obtained from an image.

A distance deriving unit 33 can measure the distance between the autonomic camera 11 and the target 1 by transmitting an ultrasonic pulse and measuring the time until the pulse is reflected by the object and returns by an ultrasonic sensor. Means of measuring the distance to the object is not limited to a method of utilizing an ultrasonic sensor but can also include a three-dimensional distance measuring method using multi-image sensors as a stereo camera system, a method of measuring the distance, for example, by a size of the target 1 in a frame image, or a method utilizing light, an ultrasonic wave, an RF or a combination thereof. The distance deriving unit 22 can be utilized, when the autonomic camera 11 executes a moving operation, also for obstacle detection, in addition to the deriving of the distance to the target 1. Also in case the autonomic camera 11 executes a flying operation, it can be used for measuring the distance to the ground, thereby maintaining a particular height thereabove. In case an image sensor is utilized in the distance deriving (measuring) unit 33, there can be utilized the image sensor 22 of the image pickup unit 21. The inference unit 27 reads or writes the aforementioned information in or from a memory unit 34.

Figure 3:
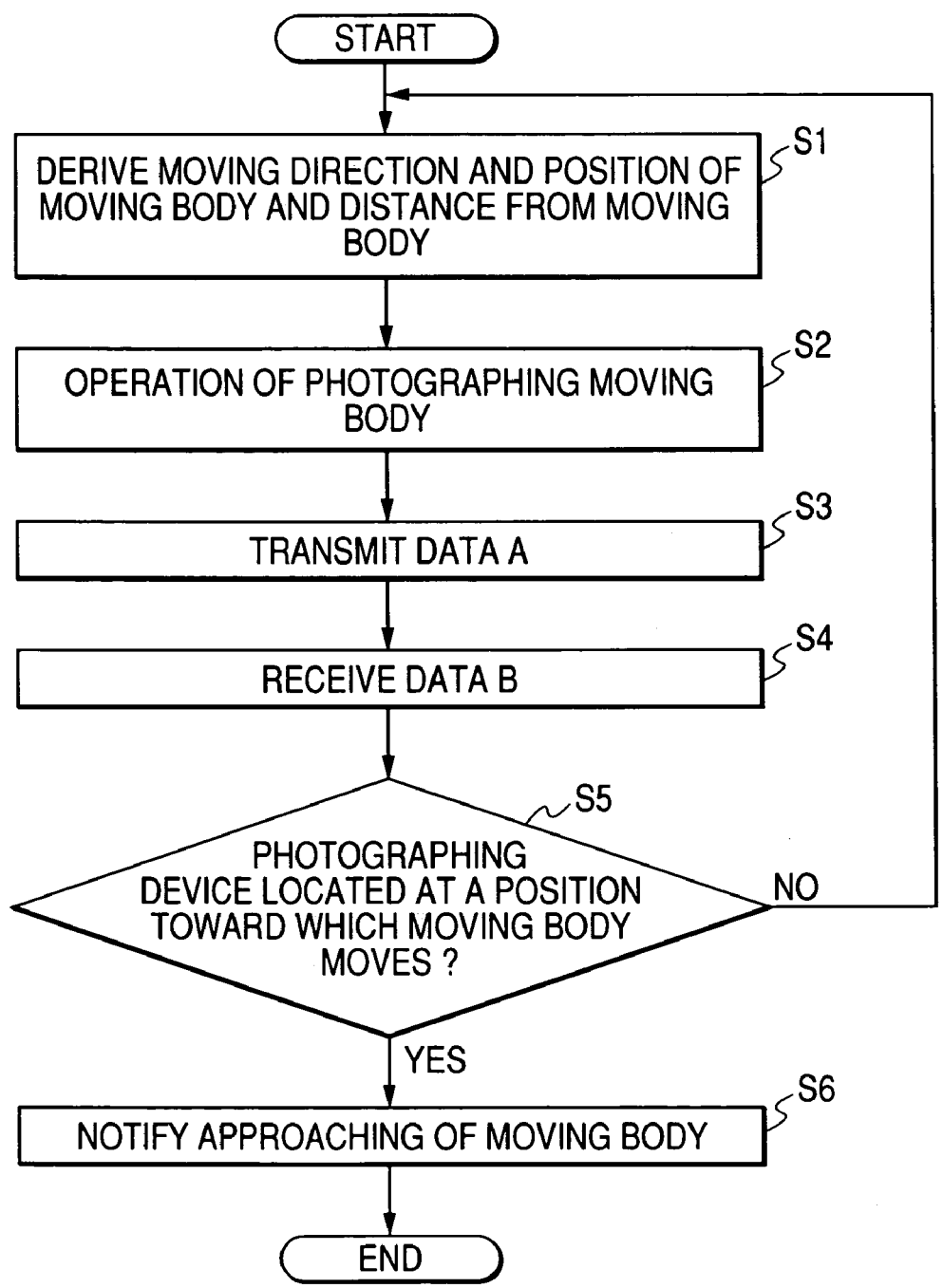
FIG. 3 is a flow chart showing a process in an photographing operation for a mobile object by the camera embodying the present invention.

FIG. 3 is a flow chart of a photographing operation of the target 1 by the autonomic camera 11. At a photographing operation of the autonomic camera 11 in a step S1, a moving direction and a position of the mobile object are derived from the image pickup unit 21. Then a distance to the target 1 is derived from the distance deriving unit 33. In the description, an autonomic camera first photographing the target 1 is represented by reference characters 11a, and an autonomic camera in the vicinity is represented by 11b. In a step S2, the autonomic camera 11a executes, in order to photograph the target 1, a change of the view angle by a pan-tilt-zooming operation, or a change in the position by a walking, a running, or a flying operation. In a step S3, the autonomic camera 11a, executing the photographing of the target 1, transmits data A to the autonomic camera 11b in the vicinity. The transmission includes an ID and the position of the autonomic camera 11a, the moving direction and a feature of the target 1, and also data such as the distance between the target 1 and the autonomic camera 11*a* and a position of the target 1 in the image angle. In a step S4, the autonomic camera 11*a* receives, from the autonomic camera 11*b*, a proportion that the target 1 moves toward the autonomic camera 11*b* in the vicinity (relation of the autonomic camera and the mobile object). A step S5 judges, from the data received in the step S4, whether the autonomic camera 11*b* is present in the moving direction of the target 1. Upon judging that the autonomic camera 11*b* is present in the moving direction of the target 1, a step S6 notifies the autonomic camera 11*b* of a fact that the target 1 is moving thereto. By such transfer, a continuous photographing operation is made possible even in case the autonomic camera 11*a* becomes incapable of tracking the target 1. In case the step S5 identifies that the autonomic camera 11*b* is not present in the moving direction of the target 1, the sequence returns to the step S1.

Figure 4:
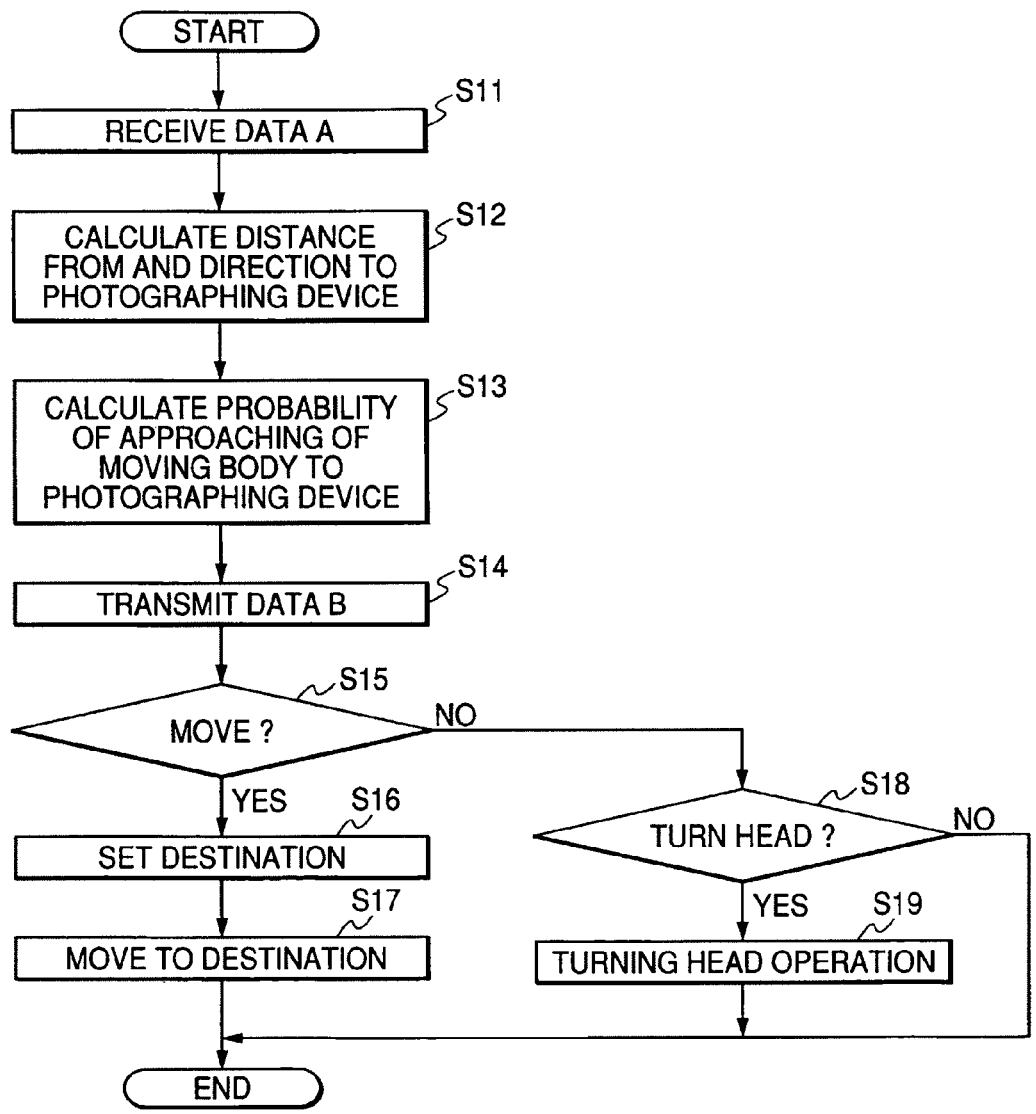
FIG. 4 is a flow chart showing a process in case data are received from a camera, embodying the present invention, and in a photographing operation for an object mobile.

FIG. 4 is a flow chart when the autonomic camera 11*b* in the vicinity receives data from the autonomic camera 11*a* about the target 1. In a step S11, the autonomic camera 11*b* in the vicinity receives data from the autonomic camera 11*a* that is tracking the target 1. The received data include the ID and the position of the autonomic camera 11*a*, the moving direction and a feature of the target 1, and also data such as the distance between the target 1 and the autonomic camera 11*a* and the position of the target 1 in the image angle. Then in a step S12, the autonomic camera 11*b* calculates, based on the received data and data obtained by itself, the distance and the direction to the autonomic camera 11*a*. A step S13 calculates, based the distance and the direction to the autonomic camera 11*a*, a proportion that the target 1 moves toward the autonomic camera 11*b*. Then in a step S14, the autonomic camera 11*b* transmits the result of inference calculated in S13 to the autonomic camera 11*a*. Then, a step S15 determines, based on the data received in the step S11 and the result calculated in the step S13, an operation of the autonomic camera itself. In case a photographing operation with a change of position is determined, steps S16 and S17 set a destination and executes a movement thereto. In case the step S15 determines no movement and in case a step S18 determines a photographing operation by a head-turning operation, a step S19 executes a head-turning control for target 1. In case the step S18 determines no head-turning operation is to be performed, no operation is executed.

In case the autonomic camera 11*b* tracks the target 1 at the reception of the data, it determines whether the recognized mobile object 1 and the target 1 recognized by the autonomic camera 11*a* are same, based on the position, the moving direction and the feature of the mobile object. In case the photographed target 1 recognized by camera 11*a* is the same as the mobile object 1 recognized by camera 11*b*, the autonomic camera 11*b* calculates an evaluation value (photographing status) of the mobile photographing operation. The evaluation value is calculated from parameters such as whether the target 1 is photographed from the front, whether it has a large size with respect to the imaging angle, and whether it is photographed without being hindered by an obstacle or the like. Such evaluation values are exchanged between the autonomic cameras 11. Then the evaluation values are compared, and an autonomic camera 11 having a larger evaluation value continues the photographing operation of the target 1.

Figure 5A:
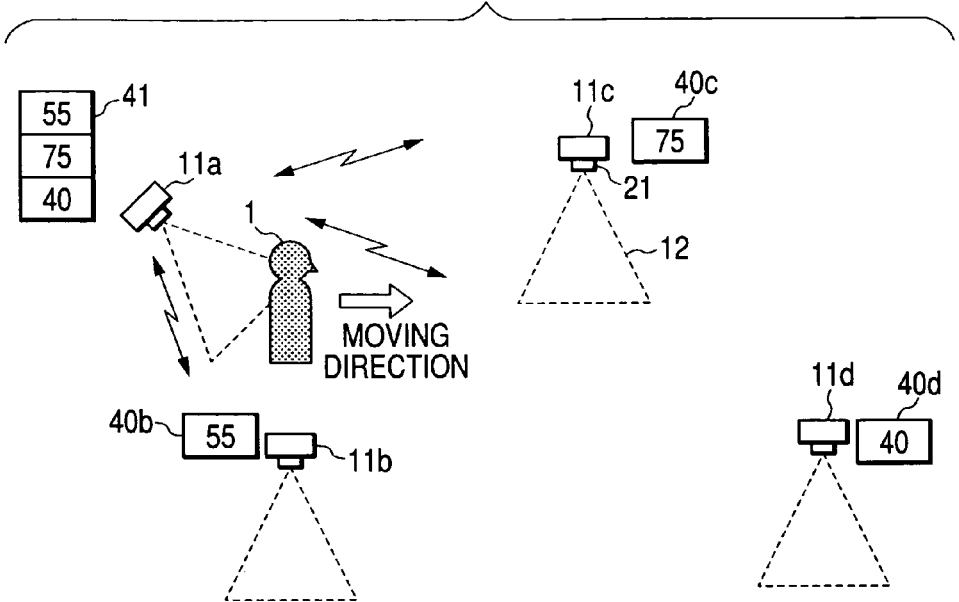
FIG. 5A is a schematic view showing an example of information exchange among multiple photographic apparatuses embodying the present invention.
Figure 5B:
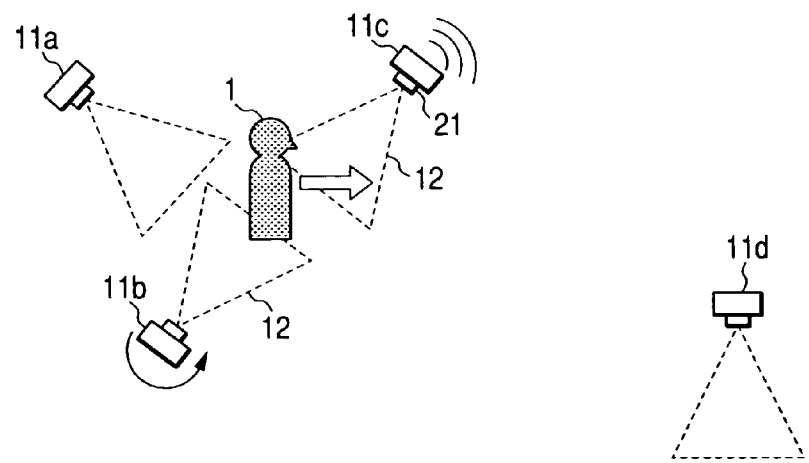
FIG. 5B is a schematic view showing an example of the operation of a camera for photographing an object mobile.

FIG. 5A is a schematic view showing an example of information exchange between multi-autonomic cameras embodying the present invention. Four autonomic cameras are respectively denoted by 11*a*, 11*b*, 11*c* and 11*d*. FIG. 5B is a schematic view showing an example of operations of the autonomic cameras 11*a*-11*d* for target 1. In FIG. 5A, the autonomic camera 11*a* photographs the target 1, and transmits information that it is in the course of tracking and photographing, to the autonomic cameras 11*b*-11*d* in the vicinity. Each of the autonomic cameras 11*b*-11*d* in the vicinity calculates a distance and a direction between the camera, based on the "position of the camera" in the received data and on the "position of the camera" obtained by the autonomic camera itself. Then, each of the autonomic cameras 11*b*-11*d* in the vicinity calculates a direction matching level, based on "a direction between the camera" and "a moving direction" of the target 1. For example, in FIG. 5A, a direction of the autonomic camera 11*c* relative to the autonomic camera 11*a* and a moving direction of the target 1 are relatively close, so that a high matching level is obtained. In addition to the directional matching level, distances of the camera are used to calculate proportions 40*b*-40*d* (hereinafter called inference results) that the target 1 moves toward the camera. Thus, the inference results 40*b*-40*d* assume a high value when the directional matching is at a high level and the distance between the camera and the target 1 is short.

The autonomic cameras 11*b*-11*d* transmit the calculated inference results 40*b*-40*d* to the autonomic camera 11*a* which tracks the target 1. Then they determine whether to execute a change in position for photographing, or to execute no operation. For example, in FIG. 5A, the autonomic camera 11*d*, determining that no operation is yet required for target 1, executes no operation. In case of a determination to execute a movement for photographing as in the autonomic camera 11*c*, it sets a "destination" from the "moving direction of the mobile object" and the "position of the camera", and starts to move toward the destination. The inference result 40 is calculated from the received data also in the course of the movement. The inference result 40 changes by the movement, and, an increase in the result indicates that the setting of the destination is correct while a decrease in the result indicates that the setting of the destination was improper. In this manner, the movement is executed under suitable modification of the destination.

For example, as shown in FIG. 5B, the autonomic camera 11*c* moves so as to approach to the target 1, while the autonomic camera 11*b* turns its head toward the target 1. In this manner, the target 1 can be captured within the recognition ranges 12 of the autonomic cameras 11*b* and 11*c*.

Photographing the target 1 is based on the received multi-inference results 41, from an autonomic camera 11 positioned in the moving direction of the target 1. The inference results 41 correspond to the inference results 40*b*-40*d*. For example, in the case of FIG. 5A, the autonomic camera 11*a* transmits, to the autonomic camera 11*c*, that the target 1 is moving thereto. The transmission by the autonomic camera 11*a* is executed at a timing when a maximum value of the inference result 41 exceeds a certain threshold value, or at a timing when the photographing by tracking becomes impossible. In this manner, even in case the view angles of the autonomic cameras 11*a*-11*d* do not mutually overlap, the target 1 can be tracked over a wide range.

In the following, there will be explained transmission data which the autonomic camera 11*a* transmits to the cameras in its vicinity upon tracking target 1 and responding data from the autonomic cameras 11 in the vicinity will be explained in detail. The transmission data which the autonomic camera 11*a* transmits to the cameras in its vicinity upon tracking target 1 are constituted of "synchronization/communication control", "ID of the transmitting camera", "ID of the destination camera", "position of the camera", "moving direction of the mobile object", "distance to the mobile object", "position of the mobile object" and "a feature of the mobile object". These data correspond to those in the step S3 in FIG. 3. The "synchronization/communication control (signal)" is information necessary for maintaining a predetermined relation in the timing of two or more cameras executing a wireless communication. The "ID of the transmitting camera" is an identification number uniquely assigned to the autonomic camera 11, and an ID of the transmitting camera executing the transmission. The "ID of the destination camera" is an ID of the destination camera to which data are to be transmitted. The "ID of the destination camera" includes a case of data transmission to a specified camera with a designation of a specified ID, a case of data transmission to multi-partners, and a case of data transmission to an unspecified multi-camera system. The "position of the camera" is a position of the camera at the data transmission, obtained by the position deriving unit 31 of the self autonomic camera 11. The "moving direction of the mobile object" is a moving direction of the target 1, inferred from the direction obtained by the direction deriving unit 32 of the autonomic camera 11 and a direction of the target 1 on the image. The "distance to the mobile object" is a distance to the target 1, obtained by the distance deriving unit 33 of the autonomic camera 11. The "position of the mobile object" is a three dimensional position of the target 1 in free space. The "feature of the mobile object" is a feature of the target 1 obtained by the image pickup unit 21 of the autonomic camera 1.

In the following, there will be explained transmission data which the autonomic camera 11b in the vicinity of the camera 11a returns. The transmission data are constituted of "synchronization/communication control", "ID of the transmitting camera", "ID of the destination camera", and "inference result". The data correspond to those in the step S14 in FIG. 4. The "inference result" means a result of calculation, by the inference unit 27 of the autonomic camera 11, of the proportion that the target 1 moves toward itself, based on the received "position of the camera", "the moving direction of the mobile object" and its own position.

As explained in the foregoing, the present embodiment has a feature in the system configuration of including a position deriving unit for specifying the position of the camera (camera 11), a direction deriving unit for deriving a direction of the camera, and an operation unit for operating the camera. Also a camera tracking a mobile object transmits data such as a camera ID, a camera position, a moving direction of the mobile object and a distance between the camera and the mobile object, to cameras in the vicinity. The camera tracking the mobile object, when the mobile object is about to go out of a detection range of the camera, receives individual situations from the cameras in the vicinity. In this manner a camera present in the moving direction of the mobile object can be specified by the multi-camera system.

The camera tracking the mobile object notifies a camera present in the moving direction of the mobile object, of a fact that the mobile object is approaching. The camera, receiving the information that the mobile object approaches, can start a preparation for mobile tracking. Therefore, the mobile object can be traced by the entire system even in case the camera is not fixed and rendered movable.

Through mutual information exchange between the camera which is tracking the mobile object and the photographic apparatuses in the vicinity, it is rendered possible to track the mobile object over a wide range, even in case the view angles of the autonomic cameras do not mutually overlap.

In the present embodiment, in a situation where the autonomic camera is displaced in a free space, an autonomic camera that has photographed a mobile object transmits data to an autonomic camera in the vicinity. Thus, the autonomic camera in the vicinity, based on the received data, determines whether to turn to a direction capable of photographing the target or to move to a position capable of photographing the target. Then, the autonomic camera can estimate the proportion that the mobile object approaches by information exchange with an autonomic camera which has already photographed the target. Thus, through the cooperative operations of multi-movable autonomic cameras, it is possible, even in the case that the view angles of the autonomic cameras do not mutually overlap, to continuously track the target 1, such as a vehicle or a person, over a wide range.

The foregoing embodiments merely show specific examples of the execution of the present invention, and should not be construed to restrict the technical scope of the present invention. Thus the present invention can be realized in various forms without departing from the technical concept and the principal features thereof.

This application claims priority from Japanese Patent Application No. 2004-266823 filed Sep. 14, 2004, which is hereby incorporated by reference herein.

What is claimed is:

1. A mobile tracking system for tracking a mobile by cooperation of multiple cameras, in which each camera comprises:
an autonomic photographic device which photographs and recognizes the mobile object;
a position deriving device which derives a position of the camera;
an obtaining device which obtains moving direction information of the mobile object;
a communication device which transmits an identifier of the camera, position information of the camera, and moving direction information of the mobile object to another camera and receives an identifier of the another camera, position information of the another camera, and moving direction information of the mobile object from the another camera;
a judgment device which judges whether the camera moves based on the information obtained by the camera and the information from the another camera; and
a changing device configured to change a translational position of the camera so that the camera can photograph a moving mobile object, when the judgment device judges that the camera moves,
wherein the changing device comprises:
a setting device which sets a destination to which the respective camera moves so that the camera can photograph the moving mobile object based on the position information of the camera and the moving direction information when the judgment device judges that the camera moves; and
a moving device which moves the camera to the set destination upon the setting device setting the set destination.

2. The mobile tracking system according to claim 1, in which each camera further comprises:
a distance deriving device which derives the distance between the camera and the mobile object;
wherein the communication device transmits distance information between the camera and the mobile object to another camera, and receives distance information between the another camera and the mobile object from the another camera.

3. The mobile tracking system according to claim 1, wherein the changing device is further configured to change an orientation of the camera so that the camera can photograph the moving mobile object, when the judgment device judges that the camera moves.

4. The mobile tracking system according to claim 3, wherein the changing device includes a direction deriving device which derives a camera angle of the camera.

5. The mobile tracking system according to claim 1, wherein the multiple cameras include a first camera and a second camera,
wherein the first camera, upon recognizing the mobile object, transmits an identifier of the first camera, position information of the first camera, information on the moving direction of the mobile object, and distance information between the first camera and the mobile object, to the second camera,
wherein the second camera transmits relationship information of the second camera and the mobile object based on the information received from the first camera, to the first camera; and
wherein the first camera, based on the relationship information received from the second camera, notifies the second camera of a fact that the mobile object moves toward the second camera.

6. The mobile tracking system according to claim 5, wherein the second camera calculates and transmits proportion information that the mobile object moves toward the second camera, based on the information received from the first camera, to the first camera; and
wherein the first camera, based on the proportion information received from the second camera, notifies the second camera of a fact that the mobile object moves toward the second camera.

7. The mobile tracking system according to claim 6, wherein the second camera calculates the distance to and the direction of the first camera based on the position of the first camera and the position of the second camera, and calculates, based on the distance and the direction, a proportion that the mobile object moves toward the second camera.

8. The mobile tracking system according to claim 6, wherein the second camera changes the position of the second camera, based on a position of the first camera, a moving direction of the mobile object, the distance between the first camera and the mobile object, and the proportion information that the mobile object moves toward the second camera.

9. The mobile tracking system according to claim 1, wherein:
the inference device, based on the position of the another camera, the moving direction of the mobile object and the distance between the another camera and the mobile object, received from the another camera, infers a camera angle of the camera, a control amount of parameters of the camera including an image angle, a presence/absence of a change in the photographing position, and a moving amount resulting therefrom; and
the changing device is further configured to change the position of the camera based on the judgment result.

10. The mobile tracking system according to claim 1, wherein the multiple cameras include a first camera and a second camera,
wherein the first camera, upon recognizing the mobile object, transmits an identifier of the first camera, position information of the first camera, information on a moving direction of the mobile object, distance information between the first camera and the mobile object and a feature of the mobile object, to the second camera,
wherein the second camera determines, based on the information received from the first camera, whether the mobile object recognized by the first camera and a mobile object recognized by the second camera are same, and, in the case that they are determined to be the same mobile object, transmits a photographing status of the mobile object to the first camera; and
wherein the first camera compares a photographing status of the mobile object in the first camera with a photographing status of the mobile object in the second camera.

11. The mobile tracking system according to claim 10, wherein the first camera continues a photographing operation according to the result of the comparison between the photographing status of the mobile object in the first camera and the second camera.

12. The mobile tracking system according to claim 10, wherein the photographing status of the mobile object is a photographing evaluation value according to whether the mobile object is photographed from the front, the size of the mobile object in the image angle, or the presence/absence of an obstacle.

13. The mobile tracking system according to claim 3, wherein the changing device is further configured to change at least one panning, tilting and zooming, or changes the position of the camera by walking, running or flight of the camera.

14. The mobile tracking system according to claim 1, wherein the communication device executes a wireless communication.

15. The mobile tracking system according to claim 1,
wherein the communication device receives a feature of the mobile object, and
wherein the judgment device judges, based on the received feature of the mobile object from the communication device, whether the mobile object photographed by the photographing device is the same as the feature received by the communication device, and judges whether the camera moves or not.

16. The mobile tracking system according to claim 1,
wherein the judgment device judges whether the mobile object is photographed from a predetermined direction, and judges whether the camera moves or not.

17. The mobile tracking system according to claim 1,
wherein the judgment device judges whether the camera moves based on a size of the mobile object within an imaging range.

18. The mobile tracking system according to claim 1,
wherein the judgment device judges whether the mobile object is photographed by the camera without being hindered by an obstacle, and judges whether the camera moves or not.

19. A camera comprising:
an autonomic photographic device which a photographs and recognizes a mobile object;
an obtaining device which obtains moving direction information of the mobile object;
a position deriving device which derives the position of the camera;
a communication device which transmits an identifier of the camera, position information of the camera, and moving direction information of the mobile object to another camera and receives an identifier of another camera, position information of another camera, and moving direction information of the mobile object from another camera;
a judgment device which judges whether the camera moves based on the information obtained by the camera and the information from another camera; and a changing device configured to change a translational position of the camera so that the camera can photograph a moving mobile object, when the judgment device judges that the camera moves, wherein the changing device comprises:

a setting device which sets a destination to which the camera moves so that the camera can photograph the moving mobile object based on the position information of the camera and the moving direction information when the judgment device judges that the camera moves; and a moving device which moves the camera to the set destination upon the setting device setting the set destination.

20. A photographing method comprising:

performing the following steps using a processor;

a photographing step of photographing using a camera, that includes an autonomic photographic device, and recognizing a mobile object;

a position deriving step of deriving a position of the camera;

an obtaining step of obtaining moving direction information of the mobile object;

a communication step of transmitting an identifier of the camera, position information of the camera, and moving direction information of the mobile object to another camera and receives an identifier of another camera, position information of another camera, and moving direction information of the mobile object from another camera;

a judgment step of judging whether the camera moves based on the information obtained by the camera and the information from another camera;

a changing step of changing a translational position of the camera so that the camera can photograph a moving mobile object, when the judgment step judges the camera moves, wherein the changing step comprises:

a setting step of setting a destination to which the camera moves so that the camera can photograph the moving mobile object based on the position information of the camera and the moving direction information when the judgment step judges that the camera moves; and a moving step of moving the camera to the set destination upon the setting step setting the set destination.

* * * * *